3,257,459
PREPARATION OF DIETHYL KETONE IN PRESENCE OF ALKALINE MEDIUM
Edward A. Swakon, Hammond, Ind., and Edmund Field, Chicago, Ill., assignors to Standard Oil Company, Chicago, Ill., a corporation of Indiana
No Drawing. Filed Mar. 20, 1961, Ser. No. 96,715
1 Claim. (Cl. 260—597)

This invention relates to the cobalt catalyzed reaction between a mono-olefinic compound, carbon monoxide and water to produce alcohol, aldehyde, ester, and ketone products. This invention also relates to the control of the reaction of the olefinic compound with carbon monoxide and water to enhance the production of the alcohol, aldehyde or ketone product.

Some of the chemistry involving the reactions of carbon monoxide has been studied and reported in detail. Commercially, however, only the oxo reaction and the Fischer-Tropsch reaction have been developed. In the oxo reaction carbon monoxide and hydrogen in substantially equimolecular proportions are added to olefins, preferably in the presence of a cobalt catalyst to produce primarily an aldehyde and at higher temperatures, about 180° C., a portion of the aldehyde may be reduced to the corresponding alcohol. In the Fischer-Tropsch reaction water gas is catalytically converted primarily to hydrocarbons and small amounts to oxygenated hydrocarbons. In a modified Fischer-Tropsch reaction H. Kolbel and W. Janicke (Brennstoff—Chem., 39, 368–9 (1958)) reported that olefins and aliphatic carbonyl compounds can be reduced with a carbon monoxide-water mixture at 180–250° C. and one atmosphere in the presence of iron, cobalt and nickel catalysts. For example, propylene was reduced to propane, acetaldehyde was reduced to ethanol and acetone reduced to isopropyl alcohol.

The reaction between cyclohexene with carbon monoxide in the presence of isopropanol is reported by Natta et al. (JACS 74, 4496 (1952)) to produce cyclohexylcarbinol, isopropyl hexahydrobenzoate and acetone. When n-butanol was used as a solvent for the same reaction, cyclohexane and butyl butyrate are reported as the products (Gazz. Chim. et al., 6, 80 (1950)). When ethylene was employed as the olefin in the same reaction with isopropanol as the solvent, it is reported that diethyl ketone is the predominant product. In this reaction the ketone formation is reported as dropping off sharply as the olefin reactant is increased in size and that beyond a $C_4$ olefin almost no ketone was formed.

Buckley and Ray (J. Chem. Soc., 1949, 1154) reported that benzyl alcohol, phenylmethylcarbinol and benzhydrol are reduced with carbon monoxide at 150–250° C. and 3000 atmospheres in the presence of Raney cobalt to the corresponding hydrocarbons.

In U.S. Patent 2,911,443, issued to H. W. B. Reed and P. O. Lenel, an improved process for the preparation of alcohols by the carbonylation of olefins is disclosed. According to this process an olefin is reacted with carbon monoxide in water in the presence of a suitable base and iron pentacarbonyl. Suitably the base must be sufficiently strong to catalyze the reaction but not so strong as to form a stable carbonate. For this reason the base is generally organic and a tertiary amine is preferred. An improved process of this patent involves the use of hydrogen to initiate the reaction and reduce what had been experienced as a long induction period.

The process of this invention relates to the directing of the reaction between the mono-olefinic hydrocarbon with carbon monoxide and water to produce oxygenated derivatives of the olefin such as an alcohol and aldehyde or a ketone. The directing of the reaction is accomplished by carrying out the reaction of the mono-olefinic hydrocarbon with carbon monoxide and water in the presence of a cobalt catalyst and in an alkaline medium. The reaction is carried out at a temperature above 100° C., desirably in the range of 150 to 400° C. and preferably in the range of 200 to 300° C. Suitably the process of this invention is carried out at pressures of from 10 to 10,000 atmospheres, desirably 20 to 2,000 atmospheres and preferably 50 to 1,000 atmospheres of carbon monoxide.

Although the process of this invention is somewhat analogous to the oxo reaction, the difference between the process of this invention and the well-known oxo reaction is readily apparent. For the purposes of the process of this invention it is generally unnecessary to add hydrogen, although a mixture of carbon monoxide with hydrogen may be employed as the source of carbon monoxide. Under some circumstances for the process of this invention even carbon monoxide per se can be omitted for, as will be hereinafter demonstrated, the carbon monoxide can be supplied through the use of formic acid and/or alkali metal formates.

It is preferred to add cobalt carbonate as the source of cobalt for the cobalt catalyst, but the process of this invention is not limited to this single preferred form of supplying the cobalt for the catalyst. Generally, cobalt for the catalyst can be added as cobalt acetate, formate, and other cobalt carboxylates as well as its oxides and carbonyls.

As hereinbefore indicated, a reaction involved in the process of this invention can be directed with respect to the products produced by employing a cobalt catalyst in an alkaline reaction medium. It appears that the effect of the cobalt catalyst is promoted with the base in the alkaline reaction medium. Strongly basic materials such as the alkali and alkaline earth metal oxides and hydroxides are useful base promoters. Non-reactive amino compounds such as tertiary amines and guanidines are also useful base promoters. The base promoters providing the alkaline reaction medium can also be employed as their formates. Reactive amino compounds such as ammonia, primary and secondary amines and compounds supplying the ammonium radical react readily with the mono-olefinic compounds in the reaction system to form amines and amides and, hence, are not desirable as base promoters in the process of this invention. For the purposes of the process of this invention sodium and potassium hydroxides, sodium and potassium formates, tertiary alkyl amines and tetra-substituted guanidines are the preferred base promoters to provide the alkaline reaction medium. Specific tertiary alkyl amines include but are not limited to trimethylamine, triethylamine, pyridine, quinolione, tripropylamine, and triamylamine. The preferred tetra-substituted guanidines include but are not limited to tetramethylguanidine, tetraethylguanidine, tetraphenylguanidine, tetratolylguanidine, and the like.

The amount of base promoter necessary to provide the alkaline medium for the reaction of the process of this invention can be varied over a wide range. In general it would be suitable to employ about 0.001 mole of the base promoter per mole of olefinic reactant to observe the promotional effect. Increasing the ratio of the base promoter to an olefin up to equimolecular proportions increases the promotional effect of the base promoter.

Cobalt catalyst is suitably employed in amounts of up to 100 mole percent of cobalt metal based on the olefinic compound. Suitably the combined amount of cobalt and base promoter in the catalyst system will be in the range of 0.01 to 100 mole percent, desirably in the range of 0.1 to 50 mole percent and preferably in the range of 0.5 to 10 percent, all based on the olefin reactant.

Mono-olefinic reactants suitable for the process of this invention include aliphatic mono-olefinic hydrocarbons, cyclo-aliphatic mono-olefinic hydrocarbons, aromatic hydrocarbons containing a mono-olefinic chain and unsaturated alcohols, aldehydes and acids containing a single ethylenic double bond. Specific mono-olefinic reactants include, but are not limited to, ethylene, propylenes, butenes, pentenes, hexenes, heptenes, octenes, diisobutylene, cyclohexene, cyclopentene, cycloheptene, styrene, methyl styrenes, α-methyl styrene, vinyl naphthylene, allyl benzene, allyl naphthalene, limonene, indene, pinene, bornylene, acrylic acid, methacrylic acid, crotonic acid, 3-butenoic acid, oleic acid, 2-ethylidene-1-heptanol, α-vinyl benzyl alcohol, 2-phenyl-4-penten-2-ol, 3-phenyl-3-penten-2-ol, acrylaldehyde, 2-pentenol, glutaconaldehyde, and the like.

In addition to the alcohol, aldehyde and ketone products, the formation of ester products has also been observed. The alcohol residue of the ester is the same as the alcohol product and the acid residue of the ester is the acid corresponding to the alcohol and aldehyde. As would be expected, the olefinic compound may also be reduced to the corresponding saturated hydrocarbon, but such a side reaction takes place only to a limited extent.

The process of this invention can be carried out in the absence or in the presence of a reaction solvent. The choice of a solvent between a polar and a non-polar solvent or no solvent will have a marked effect on the products resulting from the process of this invention. When a polar solvent is employed, the reaction produces essentially only aldehyde and/or alcohol. However, aldehyde, alcohol, ketone and acid products (in the form of an ester of the alcohol) are all produced when a non-polar solvent or no solvent is employed. Thus, the process of the invention can be controlled or directed with respect to products by the choice of reaction solvent.

Before considering further the process of this invention in a more detailed manner, it is well to consider some of the aspects of the closely related oxo reaction. In the oxo synthesis carbon monoxide and hydrogen react with the olefin to first produce an aldehyde. Presumably an aldehyde is first formed in the process of this invention. It is known in the oxo synthesis that a strong reducing atmosphere will convert the aldehyde to alcohol. The presence of an excess of olefin can effect conversion of the reaction products to ketones. Disproportionation of the aldehyde product may also be possible by molecular condensation to yield an ester. The process of this invention can be directed to minimizing the yield of ester product which, in general, could be prepared more advantageously by other chemical reactions and also directed to enhance the yield of aldehyde, alcohol, or ketone as desired.

There are some disclosures with respect to the reaction between carbon monoxide and water with olefins. Such disclosures, for example, can be found in Acetylene and Carbon Monoxide Chemistry, by Copenhaver and Bigelow, Reinhold Publishing Corporation, wherein much of the pre-World War II work of Reppe is discussed. Much of the early work of Reppe concerning the reaction of carbon monoxide and water apparently was carried out in the presence of iron and nickel catalysts. Although iron, nickel and cobalt are of the same metal family, it is well recognized that in the carbon monoxide chemistry they are not in all respects equivalents. For example, the electronic structure of cobalt differs significantly from that of iron and nickel, and for this reason cobalt is known not to form a simple carbonyl. It is also known that the hydrocarbonyl of cobalt (or carbonyl hydride) is very strongly acidic and the hydrocarbonyl of iron is far less acidic. The strongly acidic nature of cobalt carbony hydride precludes any prediction of similarity in behavior of cobalt carbonyl hydride to the behavior of iron carbonyl hydride in the alkaline medium. For example, employing the less acidic metal carbonyl catalysts in the alkaline medium, it has been observed that carbon dioxide is a reaction product when an olefin is reacted with carbon monoxide and water. When employing these less acidic carbonyl catalysts (of iron and nickel) the use of the alkaline reaction medium provided by an alkali metal, alkaline earth metal or amine formate is undesirable. Again, because of the marked differences between cobalt carbonyls and the carbonyls of iron and nickel, the process of this invention employs as one of the preferred base promoters, alkali metal formates. Thus, one cannot reason by analogy from the iron and nickel catalyzed reactions and predict the results obtainable from the process of this invention which involves the base promoted cobalt catalyst system.

Furthermore, in Reppe's work referred to above, either molar quantities of iron carbonyl are used or if catalytic amounts of iron carbonyl are used, then greater than molar quantities of amine or base are used. In the process of this invention, catalytic amounts of cobalt and base are used.

As hereinbefore indicated, the results obtainable from the process of this invention with respect to products produced can be influenced by the choice of the combination of cobalt and base promoter.

For example, the use of a guanidine as the base promoter in the presence of a non-polar solvent or no solvent results in the formation of a ketone as essentially the only product. Whereas alkali and alkaline earths and tertiary amines when employed as base promoters cause the process of this invention to produce in the presence of no solvent or a polar solvent, alcohol, aldehyde and ketone products as well as some ester.

The process of this invention including the hereinbefore discussed variations resulting in control of products produced will be hereinafter in llustrated in the specific examples.

*Example 1*

A stainless steel reaction vessel of 300 milliliter reaction capacity mounted for rocking to provide agitation is charged with 41 grams (0.5 mole) cyclohexene, 36 grams (2.0 moles) water, 2 grams cobalt carbonate and 2 grams potassium hydroxide. The reactor is pressurized with carbon monoxide to 3600 pounds per square inch gage (p.s.i.g.). The mixture in the reaction vessel is heated to 260° C. and maintained at this temperature for five hours while the reaction vessel is rocked. The internal pressure in the reaction vessel reaches a maximum of 6200 p.s.i.g., drops to 4600 p.s.i.g. at the end of the 5-hour reaction period and is 2200 p.s.i.g. when the contents of the reaction vessel are cooled to ambient room temperature, about 25° C.

Unreacted carbon monoxide and carbon dioxide are removed to depressurize the reaction vessel and its contents discharged and weighed. There are recovered 71 grams of reaction product. Some of the reaction mixture is lost during venting. The product separated into two layers: a top organic layer and a bottom aqueous layer. The top organic layer is recovered. About one-half of the oily product distills at 70 to 185° C. at atmospheric pressure and contains cyclohexene, cyclohexane, cyclohexylaldehyde and cyclohexylcarbinol. Of the remainder boiling above 185° C. and atmospheric pressure, about 95% distills at 128 to 129° C. and 4 mm. Hg. By gas chromatography this fraction is determined to be essentially one chemical compound. Infra-red analysis shows a strong carbonyl band at 5.7 to 5.8 mm. This fraction is characterized as dodecahydrobenzylbenzoate.

The composition of the organic layer of the reaction product is as follows:

|  | Percent By Volume | Boiling Point ° C. of Fraction |
|---|---|---|
| Cyclohexene and cyclohexane | 10.0 | 70 to 155/atmospheric. |
| Cyclohexylaldehyde | 5.0 | 155–185/atmospheric. |
| Cyclohexylcarbinol | 40.0 | 185/atmospheric. |
| Dodecahydrobenzylbenzoate [1] | 40.0 | 128–129/4 mm. |
| Residue | 5.0 | Above 129/4 mm. |

[1] Dodecahydrobenzylbenzoate was identified by molecular weight (theory: 224; Found: 222), refractive index (reported: 1.4770; Found: 1.4758) and analysis for carbon and hydrogen (oxygen by difference):

|  | Calculated | Found |
|---|---|---|
| C | 75.0 | 74.9 |
| H | 10.75 | 10.64 |
| O | 14.25 | 14.46 |

*Example 2*

To the reaction vessel described in Example 1 there are charged 21 grams of cyclohexene, 75 milliliters methanol, 9 grams water, 2 grams cobalt carbonate and 2 grams potassium hydroxide. The reaction vessel is pressurized with carbon monoxide to a pressure of 3600 p.s.i.g. and sealed. The contents in the reaction vessel are heated to 260° C. with rocking and maintained at this temperature for 10 hours. During the reaction a maximum pressure of 8200 p.s.i.g. at 260° C. is reached. At the end of the reaction the pressure in the reaction vessel is 6000 p.s.i.g. at 260° C. and upon cooling to ambient room temperature the pressure in the reaction vessel is 2000 p.s.i.g. The reaction vessel is depressurized to atmospheric pressure and the liquid reaction product is discharged into distillation apparatus. After distilling off methanol, water and unreacted cyclohexene, a single product having a narrow distillation temperature range is collected as a condensate. By analysis this product is characterized as cyclohexane carbinol.

*Example 3*

The process described in Example 2 is repeated except that 50 grams of cyclohexanol is substituted for the 75 ml. of methanol and the reaction is carried out for 5 hours. Cyclohexane carbinol was the chief product of this reaction with small amounts of methyl hexahydrobenzoate being produced. Comparing the results of Examples 2 and 3 with the results of Example 1, it will be seen that the use of a polar solvent can advantageously direct the course of reaction, minimizing side reactions so that alcohols and aldehydes are almost exclusively produced.

*Example 4*

To the reactor described in Example 1 there are charged 41 grams cyclohexene (0.5 mole), 41 grams formic acid (90%), 18 grams water, 2 grams cobalt carbonate and 2 grams potassium formate. The reactor is pressurized with carbon monoxide to 3600 p.s.i.g. and sealed. The reaction mixture is agitated by rocking the reactor and heated to 233° C., which temperature is maintained for 12 hours. There is a slow increase in pressure in the reaction vessel reaching a maximum pressure of 6100 p.s.i.g. Upon cooling the reaction mixture to room temperature, the pressure in the reaction vessel reaches 2400 p.s.i.g. The reaction vessel is depressurized to atmospheric pressure and the reactor contents are discharged into a collecting vessel. The mixture separates into two layers. This mixture is neutralized with aqueous sodium hydroxide and the upper organic layer is recovered. The organic layer is analyzed by gas chromatography by which the following composition is determined:

|  | Percent |
|---|---|
| Cyclohexene and cyclohexane | 15 |
| Cyclohexane aldehyde | 5 |
| Cyclohexane carbinol | 60 |
| Dodecahydrobenzylbenzoate | 15 |
| Other material | 5 |

Although the predominant product produced by the process of Example 4 is cyclohexane carbinol, there is again the formation of dodecahydrobenzylbenzoate. By carrying out the process described in Example 4 in the presence of a polar solvent, the formation of the ester product can be minimized or eliminated.

*Example 5*

To a reaction vessel as described in Example 1 there are charged 41 grams cyclohexene, 80 grams formic acid (90%), 2 grams potassium formate and 2 grams cobalt carbonate. The reaction vessel is pressurized with carbon monoxide to 3600 p.s.i.g. and sealed. The reaction mixture in the reaction vessel is agitated by rocking the vessel while heating to 260° C. This temperature is maintained for 3 hours. During the reaction a maximum pressure of 5100 p.s.i.g. is reached. Upon cooling the reaction vessel to ambient room temperature at the end of the reaction, a pressure of 2000 p.s.i.g. remains. The reaction vessel is depressurized to atmospheric pressure and the contents of the vessel are discharged. The reaction mixture forms two layers: the top layer is about ⅔ the total volume. The top layer is analyzed by gas chromatography. In this manner it is found that about 50% of the top layer is cyclohexene and formic acid with cyclohexane carbinol comprising about 20%, cyclohexane aldehyde about 10% and unknown materials about 20%.

*Examples 6 through 14*

The reactions between ethylene, carbon monoxide and water in the presence of a cobalt catalyst with different base promoters are carried out. For purposes of comparison the use of mixtures of carbon monoxide and hydrogen is also employed. For further comparison oxo type reactions are carried out employing ethylene as the olefin and either cobalt carbonate or cobalt carbonyl as the catalyst. Example 13 is an oxo type reaction employing cobalt carbonate and water, while Example 14 employs cobalt carbonyl and no water. The results of these processes together with the reaction conditions are hereinafter tabulated.

In general, the reactions were carried out by charging a reaction vessel as described in Example 1 with 50 grams benzene, 18 grams water, 2 grams cobalt carbonate, 14 grams ethylene at 500 p.s.i.g. and 3 milliliters tetramethylguanidine or an equivalent amount of triethylamine borane. The reaction vessel is then further pressurized with carbon monoxide to 3600 p.s.i.g., sealed and heated to reaction temperature. The reaction temperature is maintained for the time shown.

In Example 6 where potassium hydroxide (2 grams) is employed as the base promoter, the same procedure as described above is employed.

The same procedure was employed in Examples 11 and 12 but in Example 12 cobalt carbonyl (2 grams) is employed in place of cobalt carbonate. In Example 13 a mixture of equimolecular amounts of carbon monoxide and hydrogen is employed in place of carbon monoxide alone and the cobalt catalyst is cobalt carbonate. In Example 14 the cobalt catalyst is cobalt carbonyl and as in Example 12 no water is added to the reaction mixture.

TABLE I

| Ex. No. | Gas | Pressure, p.s.i. | | | Reaction | | Base Promoter | Product Contents, percent | | |
|---|---|---|---|---|---|---|---|---|---|---|
| | | Initial | Maximum | Final, 25° C. | Temp., °C. | Duration, Hours | | Aldehyde | Alcohol | Ketone |
| 6 | CO | 3,700 | 7,700 | 2,800 | 260 | 7 | KOH | 5 | 40 | 55 |
| 7 | CO | 3,600 | 6,400 | 2,900 | 260 | 5 | Triethylamine Borane | 50 | Trace | 50 |
| 8 | CO | 3,700 | 7,200 | 2,800 | 230 | 12 | Tetramethylguanidine | Trace | | 100 |
| 9 | CO | 3,600 | 6,500 | 2,600 | 230 | 4 | ---do--- | Trace | | 100 |
| 10 | CO | 3,400 | 6,300 | 2,400 | 230 | 4 | ---do--- | Trace | | 100 |
| 11 | CO/H$_2$ | 3,600 | 5,200 | 2,200 | 180 | 4 | ---do--- | 90 | | 2 |
| 12 | CO/H$_2$ | 3,600 | 6,000 | 2,800 | 180 | 4 | ---do--- | 80 | 2 | 2 |
| 13 | CO/H$_2$ | 3,800 | 5,200 | 3,000 | 180 | 3 | None | 40 | 60 | |
| 14 | CO/H$_2$ | 3,800 | 5,700 | 3,400 | 180 | 3 | ---do--- | | 90 | |

The results shown in Table I illustrate:
(1) Base promoted CO/H$_2$O reaction gives approximately 50% aldehyde and alcohol and 50% ketone.
(2) With tetramethylguanidine, ketone is produced exclusively in the CO/H$_2$O reaction.
(3) Conventional oxo reaction produces aldehyde and alcohol; more alcohol as temperature is high. The addition of tetramethylguanidine inhibits the conversion of aldehyde to alcohol. Oxo reaction produced aldehyde and alcohol exclusively as contrasted with CO/H$_2$O reaction where substantial amounts of ketone are produced.

From the foregoing, it will be apparent that the choice of base promoter has an effect on controlling the course of the reaction.

In the CO/water reaction with ethylene, approximately 50% propionaldehyde and propyl alcohol and 50% diethyl ketone are produced with conventional base promoters. Tetramethylguanidine apparently behaves differently in this reaction. When tetramethylguanidine is used, diethyl ketone is produced almost exclusively.

The product dictribution is quite different between CO/H$_2$O reactions and CO/H$_2$ (oxo) reactions. In the oxo reaction, a mixture of propionaldehyde and propyl alcohol is produced. The ratio of aldehyde to alcohol is greatly influenced by the reaction temperature and as we have now found by the presence of base. If any diethyl ketone is produced in oxo reaction, it is in very small amounts. The use of base, more specifically tetramethylguanidine, inhibits the conversion of aldehyde to alcohol at temperatures where such transformation occurs.

It has also been illustrated in the foregoing examples that the use of an alkali metal as the base promoter causes the reaction involved in the process of this invention to produce approximately 50% ketone. But even more striking is the fact that by the use of tetraalkylguanidine as the base promoter, the reaction between carbon monoxide, water and olefin is so directed as to yield ketone as substantially the only oxygenated derivative.

Having disclosed and illustrated many specific embodiments of the process of this invention, it is not our desire or intent to limit our process to these specific embodiments but rather the concept of this invention will be considered in view of the claim appended hereto.

We claim as our invention:

A process for preparing diethyl ketone as the only product which comprises reacting at 230° C. ethylene, carbon monoxide and water at a carbon monoxide pressure in the range of 3400 to 7200 p.s.i.a. in the presence of cobalt catalyst provided by cobalt carbonate and in the presence of tetramethyl guanidine as alkaline medium.

References Cited by the Examiner
UNITED STATES PATENTS

| | | | |
|---|---|---|---|
| 2,448,368 | 8/1948 | Gresham et al. | 260—533 |
| 2,577,208 | 12/1951 | Reppe | 260—597 X |
| 2,731,504 | 1/1956 | Reppe et al. | |
| 2,863,911 | 12/1958 | Buchner et al. | 260—597 X |

LEON ZITVER, *Primary Examiner.*

CHARLES B. PARKER, LORRAINE A. WEINBERGER, *Examiners.*

G. P. D'ANGELO, J. E. EVANS, *Assistant Examiners.*